United States Patent [19]

Bergna

[11] 4,410,405

[45] Oct. 18, 1983

[54] SILICA SOL PROCESS

[75] Inventor: Horacio E. Bergna, Wilmington, Del.

[73] Assignee: E. I. Du Pont de Nemours and Co., Wilmington, Del.

[21] Appl. No.: 252,885

[22] Filed: Apr. 10, 1981

Related U.S. Application Data

[63] Continuation-in-part of Ser. No. 101,877, Dec. 10, 1979, abandoned, which is a continuation of Ser. No. 732,751, Oct. 15, 1976, abandoned, which is a continuation of Ser. No. 591,097, Jun. 27, 1975, abandoned.

[51] Int. Cl.$^3$ ................ B01J 13/00; B01D 57/02
[52] U.S. Cl. ................ 204/180 P; 252/313 S
[58] Field of Search ............... 252/313 S; 204/101, 204/180 P

[56] References Cited

U.S. PATENT DOCUMENTS

| 2,601,235 | 6/1952 | Alexander et al. | 23/182 |
| 3,668,088 | 6/1972 | Iler | 204/101 |
| 3,789,009 | 1/1974 | Irani | 252/313 |
| 4,147,605 | 4/1979 | Schenker et al. | 204/101 |

Primary Examiner—Richard D. Lovering

[57] ABSTRACT

Concentrated aqueous silica sols of small silica particles about 10 nm or less in diameter and uniformly sized are prepared by a process for maintaining a constant number of silica nuclei particles prior to the deposition process. The process for maintaining a constant number of silica nuclei particles in the sol consists of forming the particles at a pH 8–10.5 and a low temperature then heating the sol through a transition temperature to a deposition temperature, maintaining the pH, removing alkali metal ions and simultaneously adding alkali metal silicate from the system at a rate such that the number of silica particles in the sol remains constant while the temperature is being raised.

6 Claims, No Drawings

SILICA SOL PROCESS

CROSS-REFERENCE TO RELATED APPLICATIONS

This application is a continuation-in-part of copending application Ser. No. 101,877, filed Dec. 10, 1979, now abandoned, which is a continuation of parent application Ser. No. 732,751, filed Oct. 15, 1976, now abandoned, which is a continuation of parent application Ser. No. 591,097, filed June 27, 1975, also abandoned.

DESCRIPTION

TECHNICAL FIELD

This invention relates to a process for the preparation of concentrated aqueous silica sols of small and uniformly sixed silica particles of about 10 or less nanometers (nm) in diameter.

BACKGROUND ART

Silica sols are made by adding sodium or potassium silicate to a dilute aqueous dispersion of small silica particles or nuclei and removing the sodium or potassium ions from the dispersion. This results in silicic acid being deposited upon the nuclei which grow to larger size and thus increase the silica concentration of the sol. In all processes of the prior art for making concentrated sols of silica particles of about 10 nm or less in diameter, it has been necessary to grow the particles in a dilute solution and then concentrate them by the evaporation of water which requires energy. In the following prior art the final sols contain particles larger than 10 nm in diameter.

There are at least three quite feasible processes by which silica sols can be made economically. These can be classified by the method of removing the cations from the dilute aqueous dispersion: (1) with ion exchange resins; (2) nonelectrolytically through membranes; and (3) by electrodialysis.

The use of ion exchange resins for making silica sols is well known and is described in U.S. Pat. Nos. 2,244,325 to Bird and U.S. Pat. No. 2,631,134 to Iler et al. U.S. Pat. No. 3,789,009 to Irani describes the use of ion exchange resins at high temperatures (60°–150° C.) to obtain dilute (10–16% $SiO_2$) "large particle" silica sols having particle number average diameter greater than about 15 nm which can be concentrated by evaporation. U.S. Pat. No. 2,601,235 to Alexander describes the processes in which nuclei of high molecular weight silica preferably made by heating a heel of silica sol above 60° C., are mixed with active silica and heated above 60° C. to obtain dilute built-up silica sols. Within the temperature range disclosed in the art (60°–150° C.) the initial number of silica nuclei decreases and the larger particles increase in average size at the expense of the smaller particles which dissolve at high temperatures. Thus, the number of nuclei during the heat-up period is not maintained constant in number and the size of the nuclei is not kept small so that the final particles are larger than 10 nm (10 millimicrons) in diameter, e.g., 15 to 130 nm (Column 6, line 1).

Non electrolytic removal of the cations through membranes is described in U.S. Pat. No. 3,756,958 to Iler.

U.S. Pat. No. 3,668,088 to Iler describes the preparation by electrodialysis at high temperature of aqueous sodium or potassium silicate, of dilute silica sols of large particle size and very dilute sols of small particle size larger than 10 nm which can be concentrated by evaporation. The patent recites that at lower temperatures only extremely small particles of colloidal silica are obtained and the sols can therefore not be concentrated without gelling (Column 2, lines 27–29). Again in this case, the number of nuclei was not kept constant during the heat-up period so that in all examples the final particle size is larger than 10 nm.

The above-referred growth of silica particles by further accretion of silica as taught by the prior art is carried out in "hot solution", i.e., 50°–100° C., for a variety of reasons:

(1) In the electrodialysis process, to reduce the electrical resistance of the electrolyte and thus reduce the power required;

(2) In the ion exchange process when using a weak acid type of cation-exchange resin, to accelerate the rate of removal of sodium from solution; and (3) To increase the rate at which soluble or active silica, released from soluble alkali metal silicate by removal of alkali metal ion, is deposited upon silica particles present in the solution.

Basically, nuclei particles for the above-described methods of making silica sols are formed whenever a dilute aqueous solution of soluble silicate, which has a pH of over 11, is reduced in pH to below about 10.5. The lower the temperature, the smaller are the resultant nuclei.

Heretofore, it has been the practice to take such nuclei dispersions, heat them to "hot solution" temperature and then to enlarge the particles by silica accretion as described above.

However, when nuclei made at a lower temperature are heated to the higher temperatures (50°–100° C.) at which particle growth is to be carried out, the nuclei are not stable especially when the particle diameter is less than about 5 nm. Smaller particles are dissolved and the remaining particles increase in average size.

The art processes effect the release of active silica under conditions of pH, temperature and rates of addition of active silica which do not result in the formation of additional silica nuclei, but in a decrease of the total number of silica nuclei. Therefore, the total number of nuclei present in the system is not kept constant during the process. When soluble silicate is added to the sol to grow the particles and to increase silica concentration, the final particle size depends on the number of surviving nuclei.

If too few nuclei survive the heating, the added active silica will be deposited in a smaller number of particles and therefore there will be faster growth and the final particles may be too large for certain applications, e.g., as a binder for ceramic bodies and refractory fibrous insulation. For those reasons, there has been a need for a way to make dispersions of nuclei particles of about 10 nm or less in diameter and then to prevent their being dissolved at the higher temperature needed for efficient particle growth. This has proved to be a serious problem especially when concentrated sols of very small particle size (e.g., 15 or 20% $SiO_2$, particles smaller than about 10 nm in diameter) are to be made by electrodialysis. However, it is also difficult to produce similar concentrated sols of small particles directly by ion exchange. Dilute sols of small particles can be made by these processes and such sols can be concentrated by evaporation of water, but this requires the expenditure of extra energy. Uniformity of particle size is important in the case of product sols of particles smaller than about 6 or 7 nm in diameter in order to avoid spontaneous growth in size during storage. If there is a spread in size, the particles increase in average size but decrease in number, thereby changing in properties.

This invention teaches a procedure to maintain constant the original number of nuclei particle in the sol while the particles are grown so that no nuclei are lost in the growth process and therefore more concentrated products of small and quite uniformly sized silica particles are obtained.

Theory of the Invention

The solubility of very small particles is greater than that of larger particles. This is not ordinarily encountered in suspensions of solids where particles are large enough to be seen under a microscope. But in the case of silica particles of colloidal size, 5 nm particles, for example, have a solubility of 140 ppm expressed as $SiO_2$ in water, while 10 nm particles have a solubility of 110 ppm (Chemistry of Silica, R. K. Iler, John Wiley & Sons Inc., N.Y. 1979, p. 55, FIG. 1.10a, Line A). When silica nuclei having diameters in the range of about 3 to 5 nm, as obtained when a dilute solution of sodium silicate is neutralized at 25° C., is heated to 95° C. for further processing and particle growth, the number of particles is greatly diminished. The smaller ones dissolve and the silica is deposited upon the larger ones. When any given particle starts to dissolve it becomes smaller and progressively still more soluble sot that it quickly disappears.

This invention discloses how to heat a sol of very small nuclei to a higher temperature without having any of the nuclei disappear.

In none of the processes disclosed in the prior art has the problem been solved. It is possible to make dilute sols containing less than 15% by weight of silica and particle diameter less than 10 nm by prior art processes and these sols can be concentrated by evaporation of water. For still smaller particles which are needed as mentioned above, it has not been possible to obtain sols more concentrated than about 15% silica with particles smaller than about 10 nm, while growing the particles at 80°–100° C. by adding concentrated sodium silicate to the system and simultaneously removing sodium because the nuclei at the beginning of the growth process at 90° C. are too large. By the time silicate has been added to obtain a concentrated sol, the particles are too large.

The objective of maintaining a constant number of nuclei particles according to this invention is obtained simply by maintaining a concentration of soluble silica in solution that is greater than the solubility of the smallest of the nuclei particles during the time the solution is being heated to the higher temperature. It is true that under these conditions, the aqueous phase is supersaturated with silica with respect to the solubility of all the nuclei including the smallest. Thus all nuclei grow somewhat in size during the heating period but no nuclei dissolve and the total number of nuclei particles remains unchanged. When more soluble silica is added to the system in the form of sodium silicate and the concentration of silica is increased, the final particle size is much smaller since the total number of particles is larger than if a certain number of the nuclei had disappeared during the heat-up period.

SUMMARY OF THE INVENTION

The invention is directed to an improvement in the manufacture of silica sols by which more concentrated, more stable silica sols of small particle size (particle diameter less than 10 nm) can be obtained as a result of the more uniform number and size of the silica particles therein. This effect is achieved by making a certain number of small nuclei and keeping this number of nuclei substantially constant (decreasing no more than 25%) while the solution is being heated from the temperature at which the nuclei are formed, through a transition temperature to a higher temperature at which particle growth is to be carried out.

More specifically, a process has been found for maintaining a substantially constant number of silica nuclei particles in a sol at pH 8–10.5 while the sol is being heated from the maximum temperature at which the particles have been formed in the range of 10°–50° C., to a temperature at least 10° C. higher in the range of 50°–100° C., at which the particles are to be grown, at a rate of about 1–4° C. per minute, preventing change in the number of nuclei by adding a solution of alkali metal silicate and removing alkali metal ions from the system simultaneously to maintain the pH in the range, the rate of addition of silicate being such as to introduce silica at a rate of 0.5–6 preferably 1–4 g/hr/1000 $m^2$ of surface of the silica nuclei in the system when the growth temperature is less than 70° C., and at a rate of 1–10 preferably 2–4 g/hr/1000 $m^2$ when the growth temperature is in the range of 70°–100° C. The product has a silica concentration from 15–30 g of silica per 100 ml of sol depending on the particle size. The larger the particle size of the product, the more concentrated it can be made. For this reason the designation of "concentrated" or "dilute" silica aquasols varies with particle size. A silica sol of 7 nm particle and 16 g $SiO_2$ per 100 ml of sol is considered to be concentrated but a silica sol of the same concentration with 14 mm particle size is considered to be dilute. In the present invention a silica sol of 7 mm particle size can be made by electrodialysis with a concentration of at least 27.5 g $SiO_2$ per 100 ml of sol. The concentration of the sols as made by electrodialysis can be increased further by evaporation. However, direct preparation of a concentrated sol, as disclosed in the present invention, is of practical importance since in this way much less water has to be evaporated to reach the final desired concentration thus gaining substantial savings in the energy consumed for production of the sols.

In particular, the invention is directed to a method for the preparation of concentration aqueous silica sols of small silica particles of about 10 nm or less in diameter comprising the sequential steps of (a) forming an aqueous solution of alkali metal silicate containing 0.2–3.0% weight alkali metal silicate, basis $SiO_2$ in water, in which the molar ratio of $SiO_2$ to alkali metal oxide is from 2.5:1–3.9:1;

(b) at a temperature of 10°–50° C., reducing the solution pH to 8–10.5, thereby spontaneously forming silica nuclei particles which are dispersed in the solution; and (c) removing alkali metal ions from the nuclei-containing alkali metal silicate solution while (1) maintaining the solution at pH 8–10.5 by addition of alkali metal silicate at a rate sufficient to maintain a constant number of particles and (2) simultaneously raising the temperature of the solution by at least 10° C. to 50°–100° C.

Stable concentrated silica sols are obtained from the solutions by the above-described processes by continuing the removal of alkali metal ions from the solution at the temperature to which it was raised in step (c) above and maintaining the pH at 8–10.5 by addition of alkali metal silicate at a rate such that the number of particles remains substantially constant for a time sufficient to enlarge the silica particles to a preselected larger average particle size.

DETAILED DESCRIPTION OF THE INVENTION

Definitions

The terms "silica sol" and "colloidal silica" refer to a dispersion of colloidal size silica particles in a liquid medium. As used herein, the liquid medium is water. Colloidal size particles include particles of from about 10 to no more than 1000 Å (1–100 nanometers).

The term "percent weight" as applied to aqueous solutions of alkali metal silicates refers to the percent by weight of silicate, measured as $SiO_2$, in the total solution.

"Average particle size" as used herein is calculated from specific surface area as estimated by measuring the amount of alkali adsorbed from solution as pH of the sol is raised from 4–9 according to a modification of the method of Sears, *Anal. Chem.*, 30, 1387 (1958). The method is set out in the Analytical Procedures infra.

Frequently, the word "silicate" is used herein as a more convenient means for expression of the term "alkali metal silicate" or sodium silicate.

As used herein with reference to the generation of nuclei, the term "spontaneous" refers to the fact that the nuclei are generated without the addition of either seed materials or of preformed silica nuclei from another source.

Nucleation

The silica nuclei used in the process of the invention are made by conventional techniques. Starting material for the nucleation step is an aqueous solution of 0.2–3% weight alkali metal silicate in which the weight ratio of silica to metal oxide is from about 2.5 to about 3.9. For purpose of obtaining controlled nucleation, it is preferred to start with a silicate solution having a pH above about 10.2 at which nucleation occurs. A pH of 10.2 results from a silicate concentration of about 0.1%, measured as silica. Therefore, it is preferred to use a silica concentration above 0.1%, especially 0.2% and higher. A pH of about 10.3 results from a silicate concentration of about 0.2%, basis silica. The upper allowable concentration of silica is determined by one or two factors depending on what method of cation removal is used. In all cases, if the silica concentration exceeds about 3.0% weight, the nuclei tend to aggregate and thus produce particles of uneven size. Furthermore, in cases where cation removal is accomplished by electrodialysis, it is preferred that the silica concentration not exceed about 1.0%. Above that amount, the excess of silicate ions in the solution tend to migrate toward and clog up the dialysis membrane.

It is desirable from an energy utilization viewpoint to minimize the quantity of alkali metal ions which must be removed from the solution. For this reason, a practical minimum weight ratio of silica to alkali metal oxide in the nucleating solution is about 2.5:1. On the other hand, if the ratio of silica to alkali metal oxide ($M_2O$) is too high, the solution is likely to contain nuclei of uncontrolled size. It is preferred that the molar ratio of silica to alkali metal oxide ($SiO_2/M_2O$) be from about 3.0 to about 3.9. An $SiO_2/M_2O$ ratio of 3.25 is particularly preferred because of its ready availability in commercial quantities at low cost.

While alkali metal silicates in general can be used in the process of the invention, sodium and potassium silicates are preferred. Because of its greater availability and economy, sodium silicate is particularly preferred and normally will be used.

The temperature of the nucleation step should be from about 10° to about 50° C. Within this range, quite uniformly small nuclei are produced spontaneously within a short period. In general, the higher the nucleation temperature, the bigger are the nuclei. A temperature of 20°–50° C. and especially 30°–50° C. is preferred to obtain appropriately sized nuclei, e.g., particles smaller than about 5 nm in diameter.

Spontaneous nucleation of the silicate solution is accomplished by reducing the pH of the solution to within the range of 8–10.5 by either of two general ways: (1) by partial neutralization of the silicate solution with acid; or (2) by removal of alkali metal ions from the solution.

In the case of the former method of reducing pH, several acids might be used. However, to simplify the problem of disposing of the resultant salt, it is preferred to use sulfuric acid. As has been noted by Iler et al., it is essential that mixing of the acid with the silicate be accomplished with extreme rapidity in order to prevent the formation of silicic acid gels which occurs if even local regions of pH 5–6 exist for an appreciable time. (*Surface and Colloid Science*, Ed. Matijevic, John Wiley & Sons, New York (1973), Vol. 6, p. 16.) In the case of the latter general method, the alkali metal ions are removed by adsorption upon an ion exchange resin or by dialysis through a cation-selective membrane. It should, however, be noted that the rate of cation removal is much too slow by simple dialysis to be economical. Thus, it is preferred to employ electrodialysis when dialytic separation is employed.

At pH less than 7 or 8, silica sols are not stable. Agglomerates of colloidal particles form and the silica sol can gel. This effect grows more pronounced as the concentration of the sol increases. In very dilute sols, low pH can be tolerated but in general should be avoided.

A solution pH of as high as 10.5 may be used when ion exchange resins are used for nucleation. However, the pH of the alkali metal silicate solution should not exceed about 9.5 when nucleation is effected by electrodialysis or by acid neutralization. At pH higher than 9.5, slicate ions are present which tend to migrate to and deposit on the membrane thus restricting the free flow of cations therethrough. Therefore, while a pH above 9.5 can be tolerated for a short time, inversely related to the pH level, it is preferred to limit operation of the process at a pH above 9.5 to short periods of time, e.g., several minutes. Furthermore, the nuclei formed by either electrodialysis or by acid neutralization tend to become unstable and poorly dispersed in the presence of an electrolyte in the solution when pH of the solution exceeds about 9.5. This maximum pH will, however, fluctuate somewhat depending on size of the nuclei.

In some instances, it will be desired to provide larger particles for the preparation of concentrated sols. A preferred way of doing this by which uniformity of particle size can be maintained is to enlarge the nuclei obtained in the manner described above for a short time at the nucleation temperature. This is done by removing alkali metal ions from the nucleated solution while simultaneously maintaining the pH of the solution within the range of 8–10.5 by the addition of silicate at a rate such that the number of nuclei remains constant until the nuclei have become enlarged to the desired size, which will ordinarily be less than about 5 nm, for example 2–5 nm.

Transition

The process of the invention is a transition step by which the nucleated solution is prepared for rapid particle growth to a high concentration of silica. In this step, the nucleated solution is raised by at least 10° C. to the temperature at which more rapid particle growth and concentration are to be carried out. However, in order to maintain uniform particle size of the enlarged particles and thus in many instances to be able to achieve higher silica concentrations without agglomeration, it is essential that this transition be carried out within the above-referred pH limits of 8–10.5 in such manner that the number of particles in the solution is substantially constant, i.e., the number of silica particles in the system at the end of the transition step does not differ more than about 25% and preferably no more than 10% from the number of particles present at the beginning of the transition step.

It has been found that this can be done by maintaining a concentration of soluble silica in the solution greater than the solubility of the smallest particles so that they cannot dissolve. This is done by (1) adding alkali metal silicate to the solution and (2) removing alkali metal ions from the system simultaneously with raising the temperature of the system.

In order to raise the solution to an adequate particle growth temperature without loss of nuclei due to their being dissolved therein, it is essential to add alkali metal silicate to the solution at a carefully controlled rate. To avoid the formation of new nuclei, it is essential that the rate of adding soluble silica be no faster than the rate at which the soluble silica is deposited on the particles already present. In practice this required balance between the introduction and removal of soluble silica can be achieved by varying the rate of alkali metal silicate addition in response to variations in the relationship between the specific surface area and the weight of silica in the solution.

Quantitatively, it has been found that at solution transition temperatures up to about 70° C., an addition rate of 0.5–6 preferably 1–4 g/hr/1000 m$^2$ of active silica will prevent the disappearance of particles. However, if the solution transition temperature exceeds 70° C., the rate should be about 1–10 preferably 2–4 g/hr/1000 m$^2$. At slower rates of addition of active silica for each given temperature, some particles tend to disappear by dissolution because not enough active silica is added during the interval, therefore the total number of particles in the system would not remain constant. The particles would decrease in number and would increase in size. On the other hand at faster rates the total number of particles in the system would not remain constant because more nuclei would be created.

In general, a preferred range of operation of the invention is to add active silica at a rate of 1–4 g/hr/1000 m$^2$ at the beginning of the heating-up (transition) interval. Nevertheless, it is better to make actual determinations of the silica surface area and from there determine whether a given rate is suitable or not.

It is possible to determine whether new nuclei are being formed by measuring the change in specific surface area of the silica in the sol during step (c). Let S be the measured specific surface area of silica in the sol being processed which, at a given time, contains a total of W grams of silica, and let S' be the calculated specific area of silica in the sol which at a later time contains a total of W' grams of silica and Sm is actual measured area at the later time. Then if no new nuclei are formed:

$$\frac{S'}{S} = \left(\frac{W}{W'}\right)^{\frac{1}{3}}$$

If the measured area (Sm) at the later time is greater than the calculated area (S') at that same later time, then new nuclei are being formed. Conversely, if the measured area (Sm) at the later time is less than the calculated area (S') at the same time, than the number of nuclei are becoming less. An alternative way of expressing the relationship is in terms of average particle diameter D, where D in nanometers equals 2750/S where S is in square meters per gram. Therefore, $$\frac{D}{D'} = \left(\frac{W}{W'}\right)^{\frac{1}{3}}$$

The average number of particles can be determined from the silica concentration and average particle diameter using the relation n=C/1.216 D$^3$, wherein C is the concentration of SiO$_2$ in gms/100 ml of solution and D is average particle diameter in centimeters (1 nm=1×10$^{-7}$ cm).

When the removal of alkali metal ions is carried out by electrodialysis in any step of the process, it is essential that the sol-electrolyte contain an alkali metal salt of a nonsiliceous anion to function as a supplementary electrolyte, as is disclosed in U.S. Pat. No. 3,668,088 referred to hereinabove. The purpose of the supplementary electrolyte is to lower the electrical resistance of the sol-electrolyte by providing anions other than silicate and hydroxyl ions to carry the current toward the anode. In the absence of supplementary electrolyte, the current is carried by hydroxyl ions and silicate ions which are present only at very low concentrations in the pH range 8–9.5. Furthermore, when the current is carried by silicate ions, these ions migrate toward the anode and deposit silica upon the membrane, thus further increasing the resistance and eventually terminating the process. There is an upper limit to the amount of supplementary electrolyte that can be present. If more than about 0.1 normal sodium salt such as sodium sulfate is present, the colloidal silica particles in the mixture tend to aggregate, even at the preferred pH of 9.

Even in the presence of supplementary electrolyte, silicate still migrates toward the anode if the pH of the sol-electrolyte is appreciably higher than about 9.5, but little migration occurs when the pH is maintained between 8 and 9.5. In this pH range the concentration of silicate ions in solution is very low relative to the nonsiliceous anion.

The supplementary electrolyte may be added in the form of the sodium salt, or a source of non-siliceous anion may be added which will form the supplementary electrolyte in situ. Preferred nonsiliceous anions are those derived from a strong acid having a dissociation constant in water of at least $1 \times 10^{-2}$ of which sulfuric acid is especially preferred.

In a preferred aspect of the process of this invention, the supplementary electrolyte of sodium sulfate is employed at a concentration of from about 0.03–0.08 normal. Within this concentration range, the sol electrolyte has a sufficiently low electrical resistivity to permit the use of a practically low voltage on the cell, while at the same time the colloidal silica concentration can be greatly increased in the course of the process by the continued addition of concentrated sodium silicate solution, so that a silica sol containing as much as 35 grams or more of $SiO_2$ per 100 mls, can be obtained without appreciable deposition of silica on the ion exchange membranes or formation of silica aggregates or gel.

As has been discussed hereinabove, addition of sodium silicate introduces active silica to the sol and increases the pH of the sol. As the sol is circulated past the ion exchange membrane the sodium ions in the sol are replaced by hydrogen ions and the pH falls. The rate of sodium silicate addition and rate of circulation of the sol must be coordinated with the rate of ion exchange through the membrane so that the sol entering the ion exchange apparatus will have a pH no higher than 9.5 and sol leaving the ion exchanger will have a pH no lower than about 8.

The rate at which the nucleated solution is heated to the particle growth temperature is to a great extent a matter of choice which is in recognition of the following factors:

(1) the more rapidly the heating is carried out, the smaller the particles will be when the growth temperature is reached; and (2) the more rapidly the heating is carried out, the faster must be the rate of silicate addition.

As a general rule, it will be preferred to heat the nucleated solution to growth temperature as rapidly as possible. Though heating periods in the laboratory of only a few minutes are possible, practical heating periods in commercial scale equipment will generally be from about one-half to about two hours.

Particle Growth

Upon completion of the temperature transition of the sol, the particles will in some instances already be of the desired size in which case further particle growth is unnecessary, for example, particles 5 nm in diameter. However, when still larger particles and concentration are needed, they are produced by conventional techniques, e.g., depositing further amounts of silica on the particles at a temperature from about 50°–100° C. The lower limit is governed chiefly by the reaction rate desired while the upper limit is determined by the boiling point of water in the electrolyte. However, in order to obtain the advantages of the invention as to uniformity of larger particle size for high concentrations, it is necessary that the temperature during the growth step exceed the nucleation temperature by at least about 10° C. and preferably 20° C.

To permit the growth of silica particles by accretion of silica from alkali metal silicate to a size sufficiently larger that the sol can be subsequently concentrated to a still higher silica content and remain stable, the growth step, like the transition step, is carried out in such manner as to avoid the formation of any substantial number of new particles as described hereinabove.

Upon completion of particle growth to the desired level, ions therein which tend to destabilize the sol, can be removed, for example, by precipitation, ion exchange or ultra filtration. The sol can then be restabilized by addition of a small amount of alkali and is thereafter very stable under ordinary storage conditions. Alternatively, if a dilute sol is produced, the supplementary electrolyte can be removed and the sol can be concentrated, for example to within the range of 10–40% by weight of silica (depending upon particle size) and stabilized with suitable amounts of alkali.

Membranes which may be used in the removal of alkali metal ions by electrodialysis are those which are impermeable to anions, but which allow the flow therethrough of cations. Such cation-selective membranes should, of course, possess chemical durability, high resistance to oxidation and low electrical resistance in addition to their ion-exchange properties. Homogeneous-type polymeric membranes are preferred, e.g., network polymers such as phenol, phenosulfonic acid, formaldehyde condensation polymers and linear polymers such as sulfonated fluoropolymers and copolymers of styrene, vinyl pyridine and divinylbenzene. Such membranes are well known in the art and their selection for use in the method of the invention is well within the skill of the art.

When the process of the invention is carried out by electrodialysis, it is ordinarily done in equipment of the general type described in U.S. Pat. No. 3,668,088. As noted therein, it is preferred that the electrolyte be agitated strongly at least near the surfaces of the membranes in order to dislodge gas bubbles, to prevent deposition of silica and to prevent the development of low pH regions. Similarly, the sol should be agitated sufficiently so that high pH and high sodium concentrations are avoided at the point of sodium silicate addition.

When the removal of alkali metal ions in the process of the invention is done by adsorption upon ion exchange resins, the resins used will ordinarily be synthetic resins of the weak acid type which contain carboxylic groups as the functional sites. Such resins are usually based upon crosslinked copolymers of styrene and divinylbenzene in particulate form. These resins can be used in either the $H^+$ or $NH_4^+$ form. The solutions involved in the process can be contacted with the ion exchange resins either by passing them through a fixed bed of resin or by admixing solution and resin and then separating the resin from the solution by filtration, settling, centrifugation and the like.

The invention will be better understood by reference to the examples given below.

Analytical Procedures

Specific Surface Area of Silica Particles in Aqueous Sols

A sample of sol containing 1.50 g $SiO_2$ is diluted to 135 ml with distilled water. To the diluted sample is added enough 4 N HCl to lower the pH to between 3.0 and 4.0, after which $30 \pm 1$ g NaCl are added and pH of the sample is then adjusted to 4.0 by addition of 0.1 N NaOH. The sample is titrated to pH 9.0 with 0.1 N NaOH and the required volume in milliliters of NaOH solution ($V_t$) is noted. Titration of a sample blank is also required. This is done by dissolving $30 \pm 1$ g NaCl in 135 ml distilled water, adjusting to pH 4.0, titrating the blank to pH 9.0 in the same manner as the sol sample and recording the required volume of NaOH ($V_b$). The specific surface area (S) in $m^2/g$ is then determined by the relationship $S=26.5 (V_t-V_b)$. Any ammonia contained in the initial sol must be removed prior to initiating the above procedure. This is done by treating the ammonia-containing sample with a strong acid ion exchange resin, filtering out and rinsing the resin with water and combining the rinse water with the sol sample.

Soluble Silica in Presence of Colloidal Silica: Silicamolybdate-yellow method for $SiO_2$ based on E. B. Alexander, *JACS*, 75, 5655 (1953).

Total Silica: Fluoride method for determining silica, S. M. Thomsen, *Anal. Chem.*, 23, 973 (1951).

Experimental Apparatus

In the examples following in which the invention is demonstrated in whole or in part by electrodialysis, the electrodialysis unit is a "cell pair" comprised of a single coated titanium base anode common to two cells in the following sequence:

Blank End Plate
Nickel Plated Steel Cathode
Cation-Selective Membrane
Spacer
Anion-Selective Membrane
Coated Titanium Anode
Anion-Selective Membrane
Spacer
Cation-Selective Membrane
Nickel Plated Steel Cathode
Blank End Plate.

Thus, each side of the anode is divided into three compartments separated by the ion-selective membranes. Tie bolts keep the stack tightly sealed. The membrane separating the catholyte from the electrolyte is an Ionics CR-6170 alkali-resistant membrane. The membrane separating the anolyte from the elctrolyte is an Ionics CR-61-CZL-183 acid-resistant membrane (Ionics, Inc., Watertown, Mass.). The two membranes are separated by a ¼" thick plastic spacer. Effective area of the membranes is one square foot.

Both membranes are suitably framed to separate them from the cathode and the anode. Plastic electrode screens prevent the membranes from touching the electrodes. Flows through the cell compartments are from the bottom of the cell to the top, which provide good flow configuration and easier exit of gases formed in the cell. Anolyte and catholyte enter via channels in the bottom of their compartments. Flow is diagonally across the cell.

Electrolyte enters from the side near the bottom of two rigid, plastic end blocks supporting the stack and exits from the diagonal top sides. The two electrolyte compartments are fed independently. When running the cell the center (electrolyte) compartment is overpressured by one psi, thus forcing the membrane to lie against the electrode screening.

The electrolyte is circulated at a rate of about 3 gallons per minute from the cell to a storage tank from which it is fed to the circulating pump. After leaving the pump, it passes through a steam-jacketed heat exchanger where it is heated according to the temperature desired in the cell and returned to the inlet of the electrolyte compartment. A sidestream of electrolyte is cooled and circulated through a cooler to a cell containing electrodes for measuring pH. Unless expressly set out otherwise, all pH measurements are measured at 25° C.

The two electrodes are connected to a source of direct current capable of supplying a total of up to 180 amperes to the cell. The current is adjustable by varying the voltage of the power supply.

EXAMPLE 1

In this Example, the invention was carried out by electrodialysis to make a silica sol in which the average particle diameter was about 10 nm.

Using the above-described "cell pair", a starting electrolyte solution was prepared by dissolving 43.2 g sodium sulfate in water to a total volume of 10 liters to obtain a 0.06 $Na_2SO_4$ solution. An anolyte solution was made by dissolving 312.5 g of 96% sulfuric acid in water and adding water to a total volume of 6 liters to obtain a 5% $H_2SO_4$ solution. Catholyte solution was prepared by dissolving 600 g of sodium hydroxide in water and adding water to a total volume of 6 liters to obtain a 10% or 2.5 N NaOH solution.

A sodium silicate solution was prepared by mixing 900 ml of "F" grade commercial sodium silicate solution ($SiO_2:Na_2O$ mole ratio of 3.25) with 100 ml of water and filtering the product through grade 615 Eaton-Dikeman Lab Filter Paper. The sodium silicate solution thus prepared contained 360 g of silica per liter.

The sodium sulfate electrolyte solution was circulated through the cell and heated to 50° C. which also heated the cell to this temperature. Sixty cubic centimeters of the sodium silicate solution was fed into the electrolyte and the electrolyte-sodium silicate mixture circulated to obtain a homogeneous solution. Silica concentration of the homogeneous solution was 0.21 g $SiO_2$ per 100 ml. The pH of the solution was 10.35. The total volume of the solution was 10,285 ml.

Power was applied and the voltage raised quickly to 11.2 volts. Current reading was 160 amps. Operation was continued for 3 minutes by which time the pH value dropped to 9.5. At this time the voltage was 11.7 and the current was 95 amps. As operation was continued, the pH dropped to 9.0 and sodium silicate solution was fed at a rate of about 845 ml per hour to adjust and keep the pH constant at 9.0.

The operation was continued and small samples of both the electrolyte containing the silica being formed and the catholyte were periodically removed and analyzed.

When the silica concentration in the electrolyte solution reached 3.5 g $SiO_2$ per 100 ml the solution was heated to 70° C. in about 8 minutes while continuing the electrodialysis operation. The operation was continued at 70° C. and pH 9 by adjusting the feeding rate of the sodium silicate solution in the sol.

During the 6.8 hours operation a total of 7600 of sodium silicate feed solution were added continuously and power applied with constant voltage while the current gradually increased from 95 to 156 amps and current density from 47.5 ASF (amps per square foot) to 78 ASF.

The volume of the electrolyte solution was kept at 10 liters ±6% throughout the run when necessary by direct addition of hot water to the electrolyte compartment.

At the end of the run the current was turned off and the silica sol product removed from the cell and allowed to cool down to room temperature.

Out of a total of 2736 g of silica introduced as sodium silicate, 2400 g or 87.7% of the original was recovered as silica sol. The specific surface area of the silica recovered was 262 square meters per gram. Concentration of the sol was 25.4 g of silica per 100 ml. The volume of the sol was about 9450 ml.

Out of the total 27.36 equivalents of Na₂O introduced as sodium silicate, 24.56 equivalents were recovered as sodium hydroxide in the catholyte compartment which corresponds to 89.6% efficiency.

The silica sol obtained was treated with a mixture of a cationic and anionic exchange resins to remove ions from the medium.

The pH of the double deionized sol was 3.4 and was then adjusted to 9.1 by adding enough 3 N sodium hydroxide solution while stirring vigorously in a blender. The sol was concentrated to 30 weight percent silica by evaporation. A small sample was saved for characterization and the rest of the sol was further concentrated to 40 weight percent silica. Both the 30% weight silica sol sample and the 40% weight silica sol were filtered through Celite filter aid. Even the 40% silica sol was perfectly stable under normal storage conditions. The 30% sol had a specific surface area (S.A.) of 230 m$^2$/g and when diluted to 9% weight SiO$_2$ had a viscosity of 5.1 cps at 25° C.

Details of the above-described operation are given in Table 1 below:

TABLE 1

Preparation of Silica Sol Having 10 nm Particle Size by Electrodialysis

| | |
|---|---|
| Feed Solution | 36 g SiO$_2$/100 ml |
| Electrolyte Outflow pH | 9 |
| Temperature - Nucleation (T$_N$) | 50° C. |
| Temperature - Particle Growth (T$_G$) | 70° C. |
| Time - Nucleation | 70 minutes |
| Time - Transition | 8 minutes |
| Time - Particle Growth | 317 minutes |
| Silica Feed Rate - at T$_N$ | 5.01 g SiO$_2$/min |
| Silica Feed Rate - at T$_G$ | 7.35 g SiO$_2$/min |
| Silica Conc. - at end of T$_N$ | 0.2 g SiO$_2$/100 ml |
| Silica Conc. - at beginning of T$_G$ | 3.4 g SiO$_2$/100 ml |
| Current - at T$_N$ | 100 amps |
| Current - at T$_G$ | 144 amps |
| Voltage | 11.5 volts |
| Total Volume of Product | 9450 ml |

| Time (min.) | Temp. (°C.) | Silica Conc. (g SiO$_2$/100 ml) | S.A. (m$^2$/g) | Part. Diam. (nm) | Part. per 100 ml × 10$^{-19}$ |
|---|---|---|---|---|---|
| 20 | 49 | 1.0 | 790 | 3.4 | 2.0 |
| 39 | 52 | 1.9 | 668 | 4.0 | 2.3 |
| 70 | 51 | 3.4 | 520 | 5.2 | 2.0 |
| 97 | 71 | 4.9 | 462 | 5.8 | 2.0 |
| 138 | 71 | 7.2 | 405 | 6.7 | 2.0 |
| 185 | 71 | 10.5 | 358 | 7.5 | 2.0 |
| 232 | 71 | 13.6 | 344 | 7.8 | 2.3 |
| 261 | 71 | 15.6 | 321 | 8.4 | 2.1 |
| 303 | 72 | 18.5 | 302 | 8.9 | 2.0 |
| 337 | 74 | 21.3 | 284 | 9.5 | 2.0 |
| 380 | 73 | 23.4 | 275 | 9.8 | 2.0 |
| 407 | 71 | 23.5 | 262 | 10.3 | 1.9 |

From the foregoing results, it can be seen that the number of nuclei were kept substantially constant within quite narrow limits (plus 15%, minus 5%) during both the transition and growth steps therefore yielding a very stable sol of uniform particle diameter.

Therefore, silica feed rate during the first step at T$_N$ (temperature at which the nuclei were formed, 50° C.) was 5.01 g SiO$_2$/min which based on the silica concentration during this step (1 to 3.4 g SiO$_2$/100 ml), the total volume of the electrolyte solution (ca. 10 liters), and the specific surface area of the silica particles measured during this period (790 to 520 m$^2$/g) as shown in the table above corresponds to values varying between 1.8 and 6.4 g SiO$_2$/hr/1000 m$^2$.

Based on similar measurements, silica feed rate during the period of transition of temperature between 50° C. and 70° C. was 1.5–2 g SiO$_2$/hr/1000 m$^2$, and during the period at temperature T$_G$ (temperature at which silica particles are further accreted for particle growth, 70° C.) the silica feed rate varied between 1.75 and 0.75 g SiO$_2$/hr/1000 m$^2$. During this T$_G$ period the silica concentration increased from 7.35 to 25.4 g SiO$_2$/100 ml, the specific surface area of the silica particles decreased from 405 to 262 m$^2$/g, and the total volume of the electrolyte solution was kept constant at around 10 liters.

EXAMPLE II

In this example, using same equipment and general procedures of Example I, a sol was prepared by electrodialysis having an average measured particle diameter of about 7.5 nm. The sol was nucleated at 30° C. from a solution containing 0.2 g SiO$_2$/100 ml, grown at the nucleation temperature for about 2 hours and then heated to 70° C. for the growing step. Total volume of the electrolyte solution was kept constant at about 10 liters throughout the run. Detailed operating conditions and the properties of the resultant sol are given in Table 2 below:

TABLE 2

Preparation of Silica Sol Having 7.5 nm Particle Size by Electrodialysis

| | |
|---|---|
| Feed Solution | 36 g SiO$_2$/min avg |
| Electrolyte Outflow pH | 9 |
| Temperature - Nucleation (T$_N$) | 30° C. |
| Temperature - Particle Growth (T$_G$) | 70° C. |
| Time - Nucleation | 132 minutes |
| Time - Transition | 11 minutes |
| Time - Particle Growth | 119 minutes |
| Silica Feed Rate - at T$_N$ | 4.2/7.6 g SiO$_2$/min avg |
| Silica Feed Rate - at T$_G$ | 7.6 g SiO$_2$/min avg |
| Silica Conc. - at end of T$_N$ | 0.2 g SiO$_2$/100 ml |
| Silica Conc. - at beginning of T$_G$ | 5 g SiO$_2$/100 ml |
| Current - at T$_N$ | 85 amps |
| Current - at T$_G$ | 150 amps |
| Voltage | 11.6 volts |
| Total Volume of Product | about 10 liters |

| Time (min.) | Temp. (°C.) | Silica Conc. (g SiO$_2$/100 ml) | S.A. (m$^2$/g) | Part. Diam. (nm) | Part. per 100 ml × 10$^{-19}$ |
|---|---|---|---|---|---|
| 28 | 30 | 1.16 | 863 | 3.1 | 3.2 |
| 52 | 30 | 2.16 | 583 | 4.6 | 1.8 |
| 86 | 30 | 3.66 | 575 | 4.7 | 2.9 |
| 122 | 30 | 5.22 | 550 | 4.9 | 3.6 |
| 163 | 70 | 7.5 | 453 | 6.1 | 2.7 |
| 201 | 70 | 10.6 | 430 | 6.2 | 3.6 |
| 236 | 70 | 13.9 | 390 | 6.9 | 3.5 |
| 257 | 70 | 16.0 | 363 | 7.5 | 3.2 |

From the loss of nuclei after nucleation, during the step at T$_N$ 30° C. it is apparent that the silica feed rate was inadequate. However, by proper adjustment of the silica feed rate, the original number of nuclei were restored and maintained during the transition to 70° C.

The measurement results given in the table correspond to addition rates of silica varying during the first step at T$_N$ 30° C. between 0.9 and 3 g SiO$_2$/hr/1000 m$^2$; during the transition step between 30° C. and 70° C., around 1.3 g SiO$_2$/hr/1000 m$^2$; and during the growth period at T$_G$ 70° C., varying between 0.9 and 1.5 SiO$_2$g/hr/1000 m$^2$.

EXAMPLE III

In this Example, again using the same equipment and general procedures of Example I, a sol was prepared having an average measured particle diameter of about 10 nm. The sol was nucleated at 30° C. from a solution containing 0.6 g SiO2/ml, grown at the nucleation temperature for 20 minutes and then heated to 80° C. for the growing step. Detailed operating conditions and the properties of resultant sol are given in Table 3 below.

TABLE 3

Preparation of Silica Sol Having 10 nm Particle Size by Electrodialysis

| Feed Solution | 36 g SiO2/100 ml |
|---|---|
| Electrolyte Outflow pH | 9 |
| Temperature - Nucleation ($T_N$) | 30° C. |
| Temperature - Particle Growth ($T_G$) | 80° C. |
| Time - Nucleation | 20 minutes |
| Time - Transition | 38 minutes |
| Time - Particle Growth | 213 minutes |
| Silica Feed Rate - at $T_N$ | 5.5 g SiO2/min |
| Silica Feed Rate - at $T_G$ | 18.5 g SiO2/min |
| Silica Conc. - at end of $T_N$ | 0.6 g SiO2/100 ml |
| Silica Conc. - at beginning of $T_G$ | 1 g SiO2/100 ml |
| Current - at $T_N$ | 75 amps |
| Current - at $T_G$ | 156 amps |
| Voltage | 11.5 volts |
| Total Volume of Product | about 10 liters |

| Time (min.) | Temp. (°C.) | Silica Conc. (g SiO2/100 ml) | S.A. (m²/g) | Part. Diam. (nm) | Part. per 100 ml × 10⁻¹⁹ |
|---|---|---|---|---|---|
| 20 | 30 | 0.97 | 990 | 2.7 | 3.9 |
| 38 | 62 | 1.98 | 805 | 3.3 | 4.5 |
| 58 | 80 | 3.82 | 595 | 4.5 | 3.4 |
| 79 | 80 | 6.3 | 430 | 6.3 | 1.8 |
| 107 | 80 | 7.5 | 405 | 7.5 | 1.5 |
| 145 | 80 | 9.9 | 368 | 7.35 | 2.0 |
| 195 | 80 | 14.1 | 332 | 8.15 | 2.15 |
| 232 | 80 | 15.0 | 300 | 9.0 | 1.7 |
| 255 | 80 | 19.5 | 284 | 9.5 | 1.9 |
| 271 | 80 | 22.5 | 265 | 10.0 | 1.9 |

The above data shows that the silica feed rate during the transition step was sufficient to maintain the number of particles at the end of the step within about 15% of the starting number (3.9 to 3.4). However, the silica feed rate during the growth step at 80° C. was inadequate to maintain the number of particles at the original level. The resultant sol, while having good uniformity as compared to the prior art practice, would have been improved still further had the number of particles been maintained substantially constant during the growth step.

Based on the data given in the table, the silica feed rate during the transition heating step between 30° C. and 80° C. started at 3.9 g SiO2/hr/1000 m² and varied between 3.4 and 4.5 g SiO2/hr/1000 m². During the growth period at $T_G$ 80° C. the silica feed rate varied between about 1.5 and 3.4 g SiO2/hr/1000 m².

EXAMPLE IV

In this Example, a silica sol was prepared in accordance with the invention by a process in which a weak acid resin was fed simultaneously with a sodium silicate solution into a heel of dilute sodium silicate. Silica nuclei formation was performed at 35° C. with a transition to 70° C.

The dilute sodium silicate heel (0.65 g SiO2/100 ml) was prepared in the following manner: 45 ml of "F" grade sodium silicate (SiO2:Na2O mole ratio of 3.25) diluted to 36 g SiO2/100 ml and filtered were added to 500 ml of tap water at 35° C. in a 2 liter graduated cylinder. The total volume in the graduated cylinder was brought to 2 liters with 35° C. tap water and added to a 4 liter beaker. Five hundred milliliters of 35° C. tap water were used to rinse the graduated cylinder to make the total volume of the solution in the beaker 2500 ml. The pH of this solution was 10.7. Thereupon 60 g of a weak acid type wet, drained resin were added at a uniform rate while stirring gently in a period of 15 minutes to bring the pH down to 9.0. The resin was Rohm and Haas IRC-84 Special.

The slurry was then filtered and the filtrate was analyzed: specific surface area of the silica was 785 m²/g, corresponding to an average particle diameter of 3.45 nm and the estimated number of silica particles was $1.35 \times 10^{19}$ per 100 ml of filtrate. One liter of the filtrate was used for this example. The filtrate had a pH 8.9 and the temperature was 35° C. Simultaneously, but separately, samples of wet, drained IRC-84 resin and sodium silicate were added to the filtrate. The wet, drained resin contains about 50% solids. About 50 ml of resin weighing about 30 to 40 g were added every 5 to 10 minutes to keep the pH between 9 and 9.5. The sodium silicate added was prepared by diluting with water 900 ml of "F" grade sodium silicate to a total of 1000 ml and then filtering. This sodium silicate solution feed with a concentration of 36 g/100 ml was fed into the reaction vessel (an open beaker) at a rate of about 11 ml per minute. During this process pH was held to between 9 and 9.5 and the temperature at 35° C.

The additions were continued until 160 ml of the sodium silicate feed had been added and the concentration of the solution in the reaction vessel was 5 g SiO2/100 ml. At this time a sample taken from the reaction vessel upon analysis showed that the specific surface area of the silica was 790 m2/g, which corresponds to an average particle diameter of 3.4 nm, and that the number of silica particles per 100 ml of solution was about $11 \times 10^{19}$.

After the above-referred sample was extracted for analysis, simultaneous addition of resin and sodium silicate was continued while (1) the reaction vessel was heated at a uniform rate to 70° C. in 15 minutes and (2) the solution pH was kept between 9 and 9.5. The additions were continued over a period covering a total time of 45 minutes during which time 505 ml of sodium silicate feed solution was added. At the end of the run the slurry was filtered and the filtered product was analyzed and found to contain 13.3 g of SiO2 per 100 ml of solution. The amount of silicate added had been calculated to give 1505 ml of product with a concentration of 12 g SiO2/100 ml. The difference found was due to evaporation of water during the process.

Specific surface area of the sol obtained was 609 m²/g which corresponds to an average silica particle diameter of 4.45 nm. The calculated number of nuclei per 100 ml of solution corrected for evaporation effect was $12 \times 10^{19}$, showing that particle growth has taken place between the time when temperature was 35° C. and silica sol concentration 5% and the time when temperature was 70° C., and silica sol concentration more than 12% without substantial change in the total number of nuclei.

Further evidence that no new nuclei were formed was that the ratio $\frac{S'}{S}$ was approximately equal to $\left(\frac{W}{W'}\right)^{\frac{1}{3}}$ where $S = 790$ m²/g, $S' = 610$ m²/g, $W = 50$ g of SiO₂ and $W' = 120$ g of SiO₂, then $\frac{S'}{S} = \frac{610}{790} = 0.77$ and $\left(\frac{W}{W'}\right)^{\frac{1}{3}} = \left(\frac{50}{120}\right)^{\frac{1}{3}} = (0.4166)^{\frac{1}{3}} = 0.74$ For storage the silica sol product was concentrated by evaporation to 15% by weight and the SiO₂/Na₂O weight ratio adjusted to 25 by addition of the necessary amount of 3 N sodium hydroxide. The resultant sol was quite stable.

I claim:

1. In a method for preparing concentrated aqueous silica sols of small silica particles about 10 nm or less in diameter and substantially uniform in size by the deposition of silica upon already-formed silica nuclei particles dispersed in a heated aqueous solution of alkali metal silicate at a temperature of 50°–100° C., the nuclei having been formed by reducing the pH to 8–9.5 at a temperature of 10°–50° C. thereby spontaneously forming silica nuclei particles which are dispersed in the solution, the improvement comprising forming the nuclei and maintaining a substantially constant number of particles by:
    (a) forming an aqueous solution which contains dissolved therein an alkali metal salt of a nonsiliceous anion at a concentration of about 0.03 to about 0.08 N, and has a concentration of alkali metal silicate in the solution no greater than about 1% wt., basis SiO₂, and reducing the pH of the solution to effect nucleation by electrodialysis of the solution at pH 8–9.5 by which alkali metal ions are removed through a cation-selective membrane;
    (b) raising the temperature of the formation solution by at least 10° C. to the deposition temperature of 50°–100° C.; and
    (c) removing alkali metal ions from the system to maintain the pH in 8–9.5 range while adding alkali metal silicate at a rate of 0.05–6 g of SiO₂/hr/1000 cm² of surface of the silica nuclei in the system when the growth temperature is less than 70° C., and a rate of 1–10 g/hr/1000 cm² when the growth temperature is in the range of 70°–100° C.

2. The method of claim 1 in which the small silica particles are less than 5 nm.

3. The method of claim 1 in which the temperature of the formation solution is raised at a rate of about 1–4° C. per minute.

4. The method of claim 1 in which the rate of adding alkali metal silicate is such as to introduce silica at a rate of 1–4 g/hr/1000 m² of surface of the silica nuclei in the system when the temperature is less than 70° C. and a rate of 2–4 g/hr/1000 m² when the temperature is in the range of 70°–100° C.

5. The method of claim 4 in which reduction of the pH of the solution is accomplished by adsorption of alkali metal ions upon a cationic exchange resin in the H⁺ or NH₄⁺ form.

6. The method of claim 5 in which removal of alkali metal ions is accomplished by adsorption upon a cationic exchange resin in the H⁺ or NH₄⁺ form.

* * * * *